Figure 2:
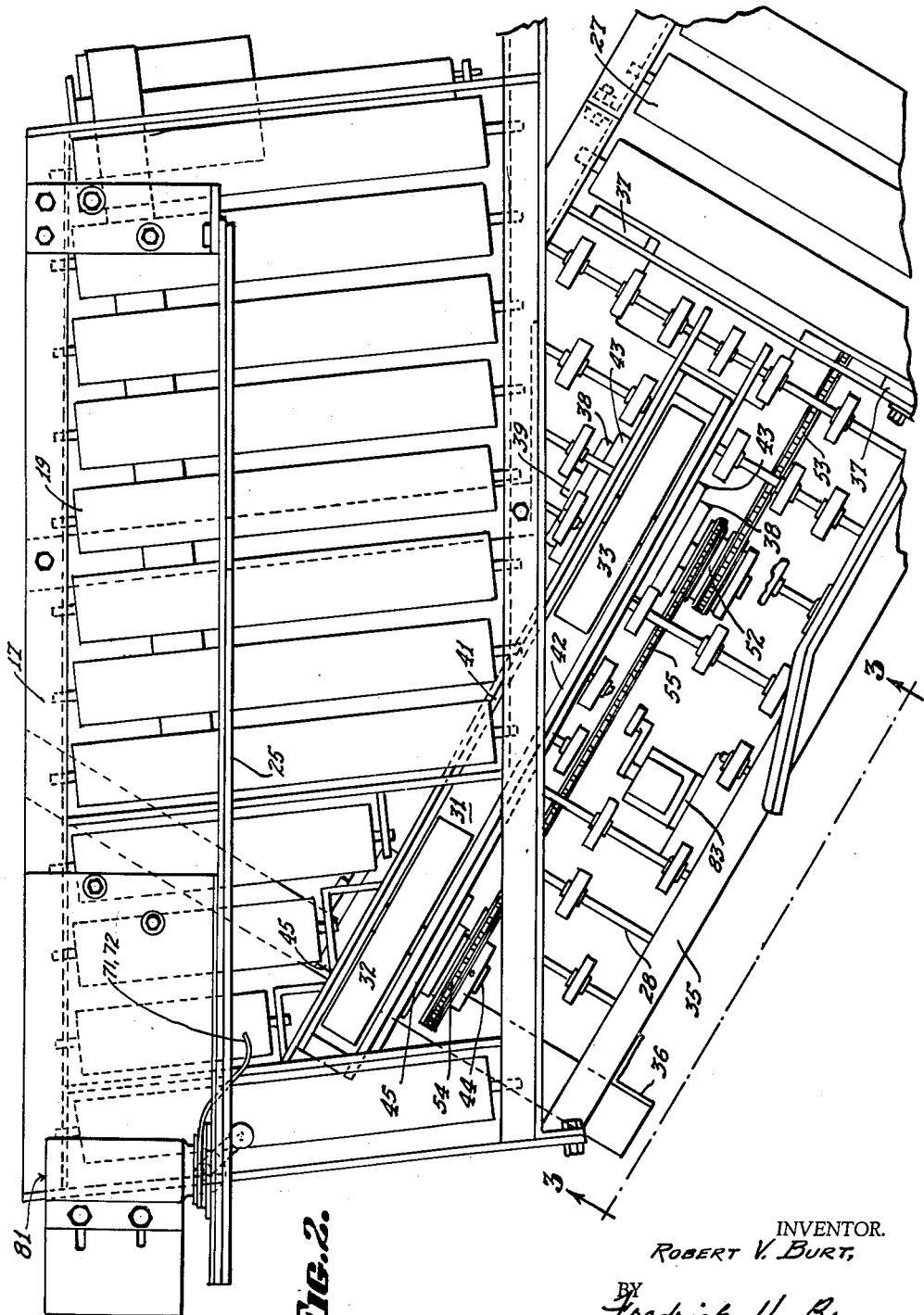

Jan. 30, 1962  R. V. BURT  3,018,873
CONTAINER SORTING APPARATUS
Filed April 7, 1959  3 Sheets-Sheet 1
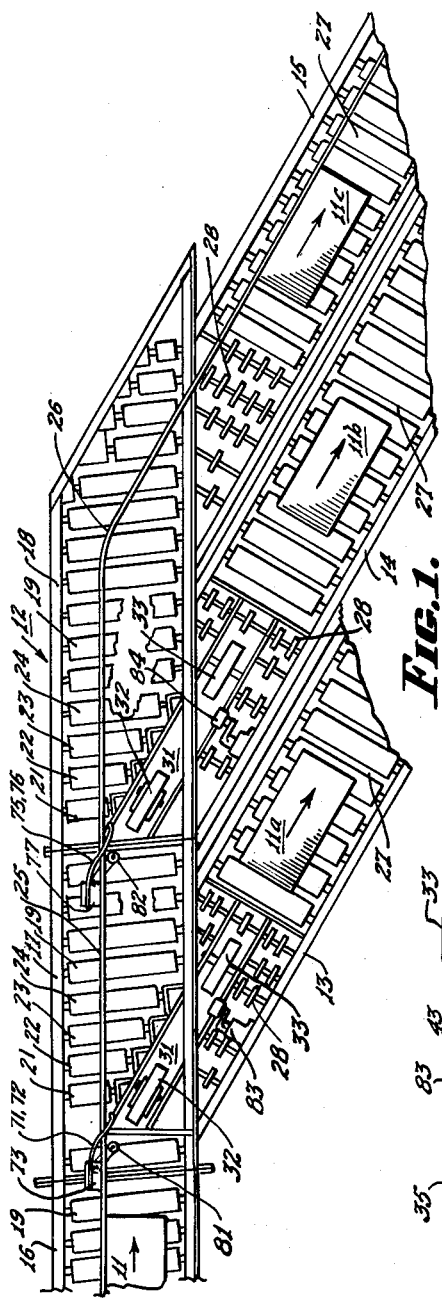
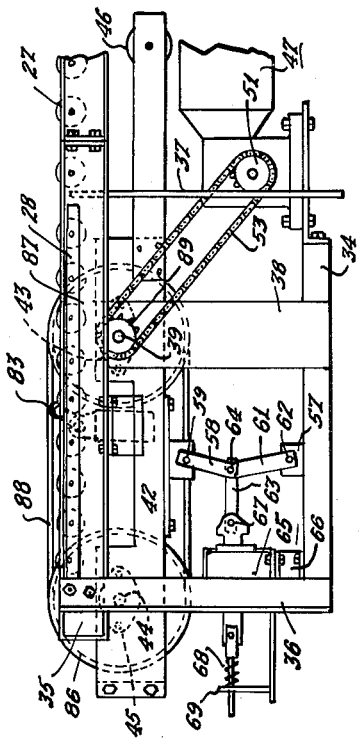
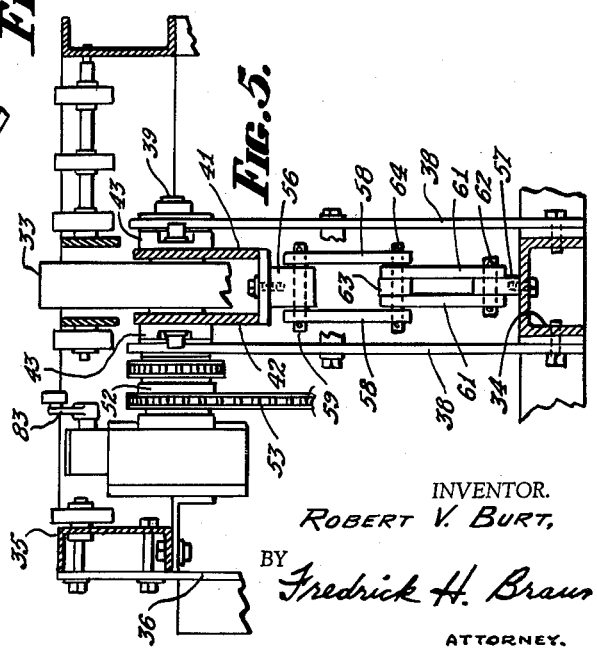
INVENTOR.
ROBERT V. BURT,
BY Fredrick H. Braun
ATTORNEY.

Jan. 30, 1962 R. V. BURT 3,018,873
CONTAINER SORTING APPARATUS
Filed April 7, 1959 3 Sheets-Sheet 2

INVENTOR.
ROBERT V. BURT,
BY
Fredrick H. Braun.
ATTORNEY.

INVENTOR.
ROBERT V. BURT,
BY Fredrick H. Braun.
ATTORNEY.

United States Patent Office 3,018,873
Patented Jan. 30, 1962

3,018,873
CONTAINER SORTING APPARATUS
Robert V. Burt, Cincinnati, Ohio, assignor to The Procter & Gamble Company, Cincinnati, Ohio, a corporation of Ohio
Filed Apr. 7, 1959, Ser. No. 804,779
7 Claims. (Cl. 198—38)

This invention relates to conveyors and particularly to devices for transferring containers from a main conveyor to any one of several branch conveyors.

One of the major problems in a highly mechanized warehousing operation wherein successive containers of dissimilar size and/or content are moving on a single conveyor is to separate the containers onto branch conveyors so that all the containers of any one size and holding a given product are on the same branch conveyor. Many solutions to this problem have been tried but none has been completely successful in solving the particular problem leading to the present invention. The present invention was made to solve the problem of diverting containers ranging from 15 to 70 pounds in weight and approaching the diverting mechanism in end-to-end abutting relation at rates of up to 80 or more containers per minute wherein successive containers might have different overall dimensions and might, in addition, contain different brands of a given product or even different products. No prior art device had ever been successfully produced for diverting containers under these conditions to a series of branch conveyors so that each branch conveyor was supplied with containers of a given size and brand.

It is a principal object of this invention to solve the problem presented in this field and to fully determine and meet all factors that are essential to its solution.

Another object of this invention is the provision of a container sorting apparatus which is capable of operating continuously and can handle containers approaching in end-to-end abutting relation at rates of 80 or even more containers per minute.

Still another object of this invention is the provision of a device of the character described which is capable of handling heavy, large and bulky containers.

It is still another object of this invention to provide a container sorting apparatus which is fully automatic and self-actuating.

A further object of this invention is the provision of an apparatus of the character described which is simple, inexpensive to manufacture and which occupies a minimum of space.

Briefly stated, in accordance with one embodiment of the invention, the container sorter is composed of a main conveyor and a plurality of branch conveyors mounted in container receiving relation to the main conveyor; a vertically reciprocable power driven friction wheel is disposed in the main conveyor at the entrance to at least one branch conveyor; the power driven friction wheel has its rotative axis disposed so that it can deliver containers to the branch conveyor with which it is associated when it is in container diverting position; the top of the power driven friction wheel is normally below an imaginary plane tangent to the top of the rollers of the main conveyor; means are provided for raising the power driven friction wheel above the said imaginary plane to a container diverting position; a second power driven friction wheel is disposed in the branch conveyor near the edge of the main conveyor and the top of the second friction wheel is normally above the imaginary plane tangent to the tops of the rollers on the branch conveyor; control means are provided to raise the first mentioned friction wheel in order to divert containers of a given size and containing a given product down the branch conveyor.

Figure 3:
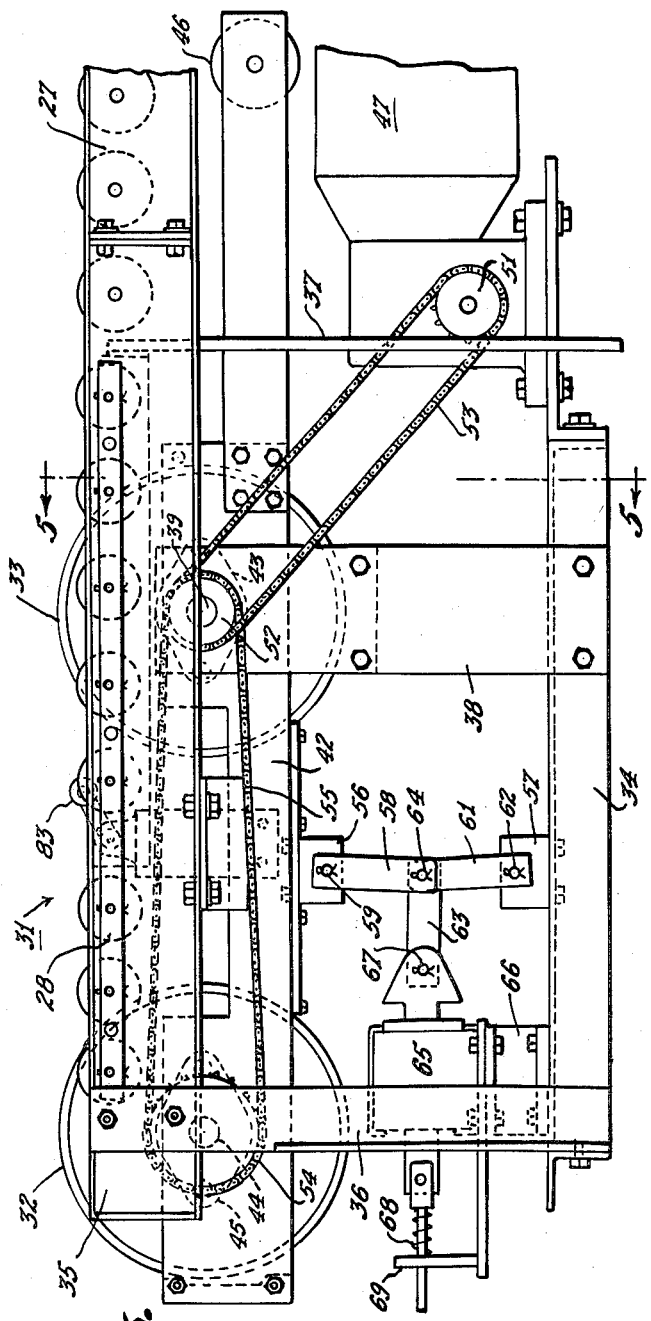
Figure 4:
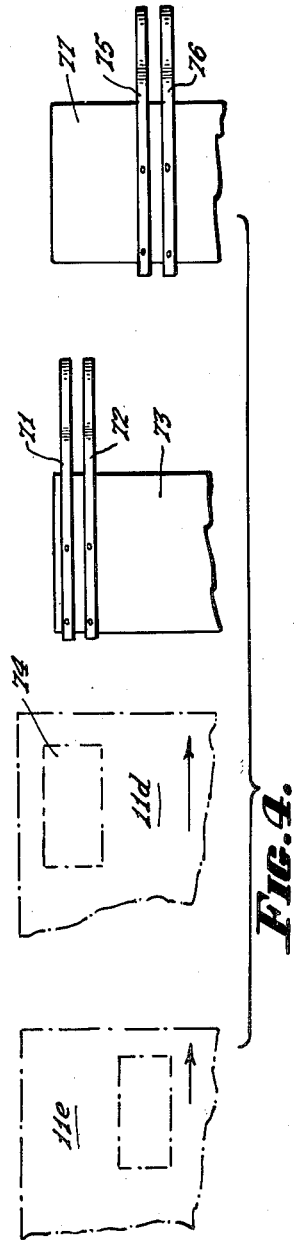

While the specification concludes with claims particularly pointing out and distinctly claiming the subject matter regarded as forming the present invention, it is believed the invention will be better understood from the following description taken in connection with the accompanying drawings in which:

FIGURE 1 is a plan view of a main conveyor showing several branch conveyors mounted in abutting relation thereto; and FIGURE 2 is an enlarged plan view of a portion of the main conveyor and one branch conveyor showing the container diverting mechanism; and FIGURE 3 is a side elevation of the diverting mechanism taken along the line 3—3 of FIGURE 2; and FIGURE 4 is a fragmentary elevation view of two conductive finger stations also showing containers marked with a conductive area; and FIGURE 5 is an elevation, partly in cross-section, showing the mechanism for raising and lowering the first friction wheel taken along the line 5—5 of FIGURE 3; and FIGURE 6 is a side elevation similar to FIGURE 3 showing a modified form of the invention.

Referring now to the drawings and particularly FIGURE 1, there is shown a typical conveyor layout in which containers 11 moving down a main roller conveyor 12 are to be diverted to one of the several branch conveyors 13, 14 or 15. In the drawing, containers 11a, 11b and 11c are shown after having been diverted onto the branch conveyors 13, 14 and 15 respectively. The main roller conveyor 12 is composed of a plurality of sections 16, 17 and 18 and may be of either the power driven or gravity type.

The construction of the main roller conveyor sections is conventional. It comprises a plurality of rollers 19 some of which are shortened as shown at 21, 22, 23 and 24 in order to accommodate the diverting mechanism to be hereinafter described. Conventional means for driving the rollers 19, 21, 22, 23 and 24 may be provided as will be understood by those skilled in the art without the need of a detailed description. A raised guide rail 25 is mounted over the rollers on the main conveyor 12 as shown. It is, of course, obvious that any containers moving to the end of the main conveyor 12 will be diverted to the branch conveyor 15 due to the curvature of the guide rail 25 as at 26. This diverting means does not, of course, form any part of the present invention.

The branch conveyors 13, 14 and 15 each consist of a roller section 27 and a skate wheel section 28, both of which are conventional methods of constructing a gravity roller conveyor although it will be understood that other kinds of equivalent conveyors may be substituted if desired. Preferably, the branch conveyors 13, 14 and 15 are mounted at a shallow angle, in the range of 30°, with respect to the main conveyor in order to reduce the angle through which the containers must be turned when diverted. This, of course, is not a critical limitation but merely a preferred manner of practicing the invention.

The diverting means indicated generally at 31 in FIGURE 1 is shown in greater detail in FIGURES 2 and 3. It will be understood, of course, that the diverting mechanism for the accumulator conveyors 13 and 14 will be substantially identical in construction. Furthermore, any number of branch conveyors can be assembled in container receiving relation to the main roller conveyor 12 and each one can be provided with a similar diverting means 31.

Referring now to the netails shown in FIGURES 2 and 3, the diverting means 31 includes a first friction wheel 32 and a second friction wheel 33. The first and second friction wheels 32 and 33 are surfaced with a material which has a relatively high coefficient of friction in order that these wheels will frictionally engage the bottom surface of containers that are to be diverted to the branch conveyors. Normally, the upper portion of the friction wheel 32 is below an imaginary plane tangent to the top of rollers 19, 21, 22, 23 and 24 so that a container can pass over the friction wheel 32 when it is in the lowered position. It is to be understood, of course, that containers are used having a large enough fore-to-aft dimension to bridge the gap in the main conveyor at the location of the friction wheel 32 when it is in lowered position. When raised, the friction wheel 32 is sufficiently above this imaginary plane to engage the bottom surface and divert containers down the particular branch conveyor with which it is associated. The second friction wheel 33 does not move vertically and its upper portion projects above an imaginary plane tangent to the tops of the rollers in the skate wheel section 28. Preferably, the axis of the first friction wheel 32 is substantially perpendicular to a vertical plane through the centerline of the branch conveyor with which it is associated although satisfactory results are obtainable if the first friction wheel is disposed so that it can deliver containers to the inlet of the branch conveyor with which it is associated. The second friction wheel 33 preferably has its axis perpendicular to a vertical plane through the centerline of the branch conveyor so that it is in a position to receive and convey containers diverted by the first friction wheel.

Means are provided for constantly rotating the two friction wheels and for raising the first friction wheel, when necessary, to divert a container. A baseplate 32 (FIGURE 3) is suspended from the side rails 35 of the branch conveyor 13 by means of the supports 36 and 37. A pair of spaced support members 38 are secured to the baseplate 34. As shown in FIGURE 2, the second friction wheel 33 is mounted on the shaft 39 which is journaled in the support members 38. The members 41 and 42 are pivotally mounted on the shaft 39 by means of the bearings 43 which are attached to the sides of the members 41 and 42. The first friction wheel 32 is secured to the shaft 44 which is journaled in the bearings 45. The bearings 45 are attached to the members 41 and 42 as shown. A counterweight 46 is mounted at the other end of the structural members 41 and 42 in order to balance the weight of the first friction wheel 32.

The friction wheels 32 and 33 are constantly driven from a motive power source which may consist of an electric motor and gear combination 47. The output of the reduction gear and motor 47 is transmitted from the sprocket 51 to the double sprocket 52 by means of the chain 53. A sprocket 54 is attached to the shaft 44 and is driven from the double sprocket 52 by means of the chain 55. In practice, the motor and gear reduction unit 47 is constantly rotated so that the friction wheels 32 and 33 are constantly turning. It is to be noted that the sprocket 54 is larger and has more teeth than the double sprocket 52. This permits the second friction wheel 33 to turn at a higher angular velocity than the first friction wheel 32. While this is not essential to the invention, it is nevertheless a preferred construction because it causes a diverted container to accelerate after being engaged by the second friction wheel 33 thus reducing the time interval for removing a container from the main conveyor.

Referring now to FIGURES 3 and 5, the mechanism for raising and lowering the first friction wheel 32 consists of a simple toggle arrangement including a pair of lugs 56 and 57, the lug 56 being attached to the structural members 41 and 42 and the lug 57 to the baseplate 34. A linkage consisting of the connecting members 58 pivoted at the pin 59 to the lug 56 and connecting members 61 pivoted at the pin 62 to the lug 57 is actuated by the link member 63 through a common central pin 64. A conventional solenoid 65 is mounted on a pad 66 secured to the baseplate 34. The solenoid 65 is connected by the pin 67 to the link member 63. A compression spring 68 is mounted at the other end of the solenoid and bears against the member 69. When the solenoid is energized, the linkage assumes the position shown in FIGURE 3 so that the upper portion of the friction wheel 32 is raised above the imaginary plane common to the tops of the rollers 19, 21, 22, 23 and 24. When the solenoid 65 is de-energized, the compression spring 68 moves the link member 63 to the right (as viewed in FIGURE 3) rotating the structural members 41 and 42 counterclockwise about the shaft 39 and lowering the first friction wheel 32 so that its upper portion is below the imaginary plane common to the tops of the rollers 19, 21, 22, 23 and 24.

Several methods of energizing the solenoid 65 are available. In the structure shown in the drawings, a pair of spaced sensing fingers 71 and 72 are mounted on a post 73 as shown in FIGURES 1 and 4. A container 11d is marked with conductive ink at the area 74 at a fixed elevation above the bottom surface of the container 11d. When the conductive area 74 contacts the fingers 71 and 72, it actuates an electronic switch which closes a circuit energizing the solenoid 65 so that the first friction wheel 32 is raised and engages the bottom surface of the container near its forward end to divert it down the branch conveyor 13. Similarly, a pair of sensing fingers 75 and 76 are secured to a post 77 which is mounted alongside the main roller conveyor 12 adjacent the branch conveyor 14. Accordingly, when a container 11e marked with a conductive area 78 closes the circuit between the sensing fingers 75 and 76, it raises the first friction wheel 32 associated with the branch conveyor 14.

The switches 81 and 82 (FIGURE 1) are provided in order to close a latching circuit to maintain the solenoid 65 energized after the conductive mark 74 has passed beyond the sensing fingers 71, 72 or 75, 76 until such time as that particular container has moved off the main conveyor. Similarly, the switches 83 and 84 are provided to break the circuit to the solenoid 65 once the container has passed off the main conveyor far enough to allow the second friction wheel 33 to carry it onto the branch conveyor. Once the container has reached this point, it is desirable to drop the first friction wheel 32, so that the following container may pass over the first friction wheel 32 if it is destined for a different branch conveyor. It is to be understood that switches 81 and 82 will override switches 83 and 84 respectively. That is, if two successive containers moving in abutting relation are to move down the same branch conveyor, the first container will be in contact with switch 83 or 84 as the second container contacts the switch 81 or 82 and the sensing fingers 71, 72 or 75, 76. In order to allow the solenoid 65 to be energized with either switch 83 or 84 depressed, the switches 81 and 82 are provided to bypass the switches 83 and 84 while either of the latter is depressed.

As will be noted in FIGURE 1, the rollers 19, 21, 22, 23, and 24, on the main roller conveyer 12 are mounted so that the included angle between a vertical plane through the axis of the rollers and the guide rail portion 25 on the downstream side of each individual roller is somewhat less than 90°. This tends to urge the containers on the main roller conveyor to bear against the guide rail 25 thus assuring that they will brush past the sensing fingers 71, 72 and 75, 76. In addition, the containers will tend to bear against the guide rail 25 if the rollers on the main conveyor 12 are somewhat lower on the side nearest the guide rail. It will be understood, of course, that neither of these expedients is necessary for the successful practice of the invention although in each case they tend to establish better performance of the entire unit.

FIGURE 6 shows a modified form of the invention in which the reference numerals of all identical parts are the same as those used in describing the previous embodiment. In the modification, the friction wheels formerly employed are replaced by a pair of sheaves which are drivingly connected by a suitable belt. The first sheave 86 is keyed to the shaft 44 and the second sheave 87 is keyed to the shaft 39. The sheaves 86 and 87 have an endless diversion belt 88 running thereover. The outer surface of the diversion belt 88 preferably has a relatively high coefficient of friction for reasons which will become evident hereafter. The form of the belt 88 is optional, it may be a V-belt, flat belt or any equivalent. The sheave 87 is constantly rotated by the motor and gear combination 47 through the sprocket 51, chain 53 and the single sprocket 89 which is keyed to the shaft 39. Obviously, of course, the first sheave 86 will be constantly rotated by the second sheave 87 through the diversion belt 88.

The operation of the modified form is similar to the embodiment previously described. Normally, the solenoid 65 is de-energized so that the first sheave 86 and that portion of the upper flight of the diversion belt 88 which is interposed between the rollers on the main conveyor is below the imaginary plane tangent to the tops of the rollers 19, 21, 22 23 and 24. When a container is to be diverted, the solenoid 65 is energized in similar fashion to the previous embodiment whereby the first sheave 86 and the upper flight of the diversion belt 88 is raised above the imaginary plane tangent to the tops of the rollers 19, 21, 22, 23 and 24. Thus the belt surface frictionally engages the forward portion of the bottom surface of a container whereby it is diverted down the branch conveyor.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. In a conveyor system wherein a plurality of classes of containers are advanced in indifferent order along a main roller conveyor in essentially end to end abutting relation, a container sorter for continuously and selectively diverting such containers by classes onto a plurality of branch conveyors so that each such branch conveyor will contain only containers of a predetermined class, said sorter comprising a main conveyor section in alignment with said main roller conveyor so as to receive containers therefrom, a plurality of branch conveyor sections mounted at substantially less than right angles with respect to said main conveyor section and in container receiving relation thereto, a first friction wheel mounted beneath said main conveyor section in slantwise relation to the path of travel of containers moving along said main conveyor section and in general alignment with the longitudinal axis of the leading branch conveyor section, means for raising and lowering said first friction wheel from an inoperative position in which its uppermost surface lies below the bearing surface of said main conveyor section to an operative position in which its upper surface lies in container contacting position, whereby when said first friction wheel is in the operative position the leading end of a container contacted thereby will be diverted onto said leading branch conveyor section, a second friction wheel mounted beneath said leading branch conveyor section in alignment with said first friction wheel and lying just beyond the adjacent side edge of said main conveyor section, said second friction wheel having its uppermost surface positioned to frictionally engage the bottom surface of a container as it is diverted onto said branch conveyor section by said first friction wheel, power means for rotating said first and second friction wheels, container sensing means in advance of said first friction wheel for actuating said raising and lowering means so as to move said first friction wheel from the inoperative to the operative position when a container advancing along said main conveyor section is of the class to be diverted onto the said leading branch conveyor section, means operative to return said first friction wheel to the inoperative position upon movement of the diverted container onto the said leading branch conveyor section and before the next succeeding container moving along said main conveyor section reaches a position overlying said first friction wheel, and means operative to override said last named means and maintain said first friction wheel in the operative position in the event the container next succeeding the diverted container is of the same class as the diverted container.

2. The container sorter claimed in claim 1 wherein said first and second friction wheels are of substantially the same diameter, and wherein said second friction wheel is driven at a greater speed of rotation than said first friction wheel.

3. The container sorter claimed in claim 1 wherein said first and second friction rollers comprise sheaves having a belt running therebetween.

4. In a conveyor system wherein a plurality of classes of containers are advanced in indifferent order along a main roller conveyor in essentially end to end abutting relation, a container sorter for continuously and selectively diverting such containers by classes onto a plurality of branch conveyors so that each such branch conveyor will contain only containers of a predetermined class, said container sorter comprising a main conveyor section in alignment with the main roller conveyor so as to receive containers therefrom, a plurality of branch conveyor sections mounted at substantially less than right angles with respect to said main conveyor section and in container receiving relation thereto, diverting means for selectively moving containers from said main conveyor section to each of said branch conveyor sections, the diverting means for at least the leading branch conveyor section comprising a first friction wheel mounted beneath said main conveyor section in slantwise relation to the longitudinal axis of said main conveyor section and in general alignment with the longitudinal axis of said leading branch conveyor section, means for raising and lowering said first friction wheel from an inoperative position in which the uppermost surface of said first friction wheel lies below the bearing surface of said main conveyor section to an operative position in which the uppermost surface of said first friction wheel lies in container contacting position, whereby when said first friction wheel is in the operative position the leading end of a container contacted thereby will be diverted onto said leading branch conveyor section, a second friction wheel mounted beneath said leading branch conveyor section in alignment with said first friction wheel and lying just beyond the adjacent side edge of said main conveyor section, said second friction wheel having its uppermost surface positioned to frictionally engage the bottom surface of a container as it is diverted onto said branch conveyor section by said first friction wheel, power means for rotating said first and second friction wheels, container sensing means in advance of said first friction wheel for actuating said raising and lowering means to move said first friction wheel from the inoperative to the operative position when a container advancing along said main conveyor section is of the class to be diverted onto said leading branch conveyor section, means operative to return said first friction wheel to the inoperative position upon movement of the diverted container onto said leading branch conveyor section before the next succeeding container moving along said main conveyor section reaches a position overlying said first friction wheel, means operative to override said last named means and maintain said first friction wheel in the operative position in the event the container next succeeding the diverted container is of the same class as the diverted container, and a guide rail overlying said main conveyor section and extending lengthwise thereof, said guide rail being positioned to be contacted by a side edge of the advancing containers so as to align them relative to said first named friction wheel and said container sensing means.

5. The container sorter claimed in claim 4 wherein the diverting means for the trailing branch conveyor comprises a curved extention of said guide rail positioned to move containers from the main conveyor section to said trailing branch conveyor section.

6. The container sorter claimed in claim 4 wherein said container sensing means comprises means for sensing indicia printed on the containers, wherein the means operative to return said first friction wheel to the inoperative position comprises switch means positioned to be contacted by a container as it is diverted onto the branch conveyor section, and wherein the means operative to override said last named switch means and maintain said first friction wheel in the operative position comprises a second switch means overlying said main conveyor section and positioned to be contacted by the containers as they reach said container sensing means.

7. The container sorter claimed in claim 4 wherein said main container section includes a plurality of generally transversely disposed rollers arranged to provide a supporting surface for the advancing containers, and wherein the axes of rotation of said rollers are inclined at an angle of less than 90° with respect to said guide rail, whereby to urge the containers on said main conveyor section against said guide rail and hence in position for positive contact with said container sensing means.

References Cited in the file of this patent
UNITED STATES PATENTS

| | | |
|---|---|---|
| 1,737,762 | Howe | Dec. 3, 1929 |
| 1,904,837 | Posey | Apr. 18, 1933 |
| 2,017,535 | Hammer | Oct. 15, 1935 |
| 2,360,661 | Eddy | Oct. 17, 1944 |
| 2,794,535 | Hauschild | June 4, 1957 |

FOREIGN PATENTS

| | | |
|---|---|---|
| 420,554 | Germany | Oct. 27, 1925 |